No. 727,737. Patented May 12, 1903.

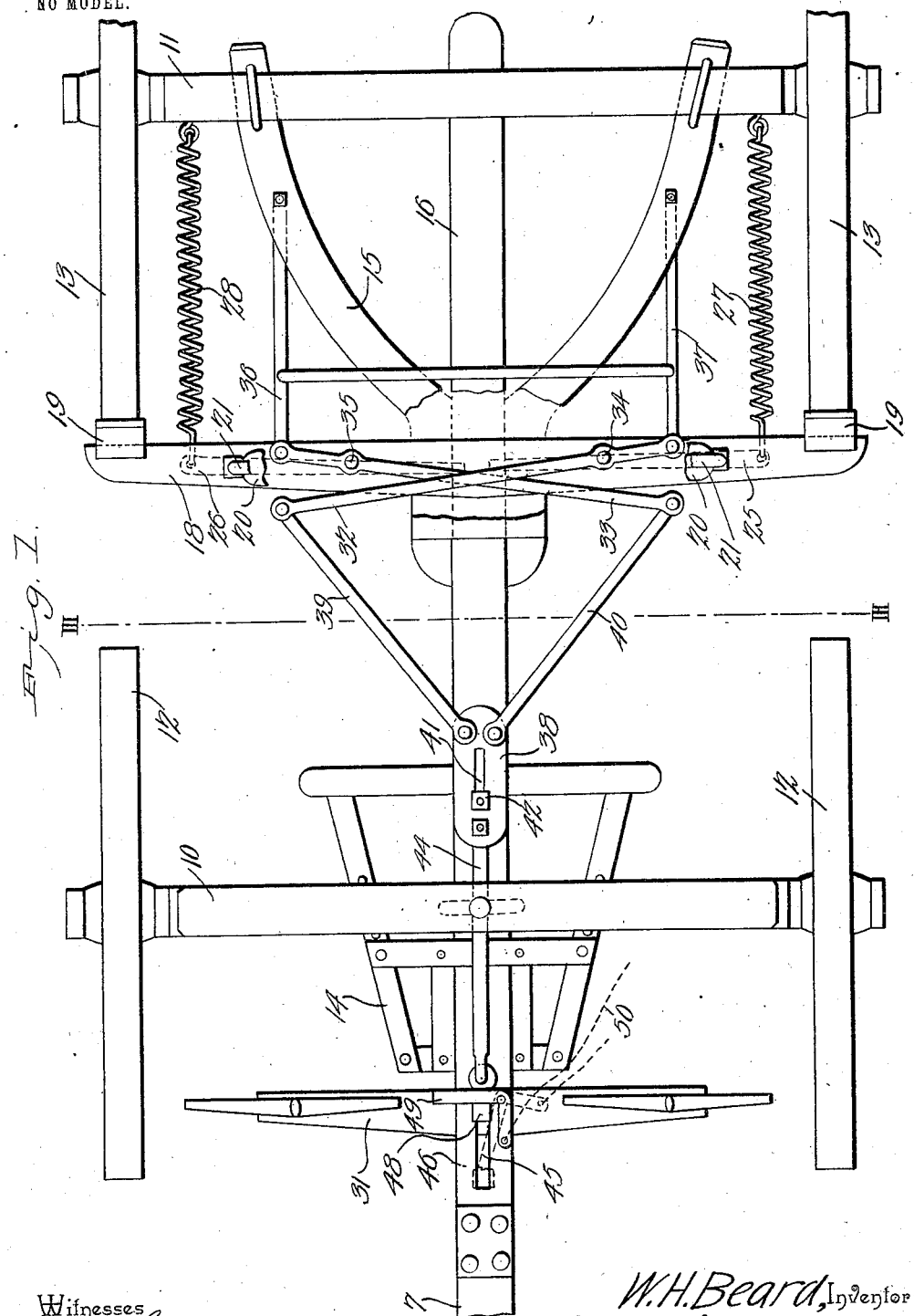

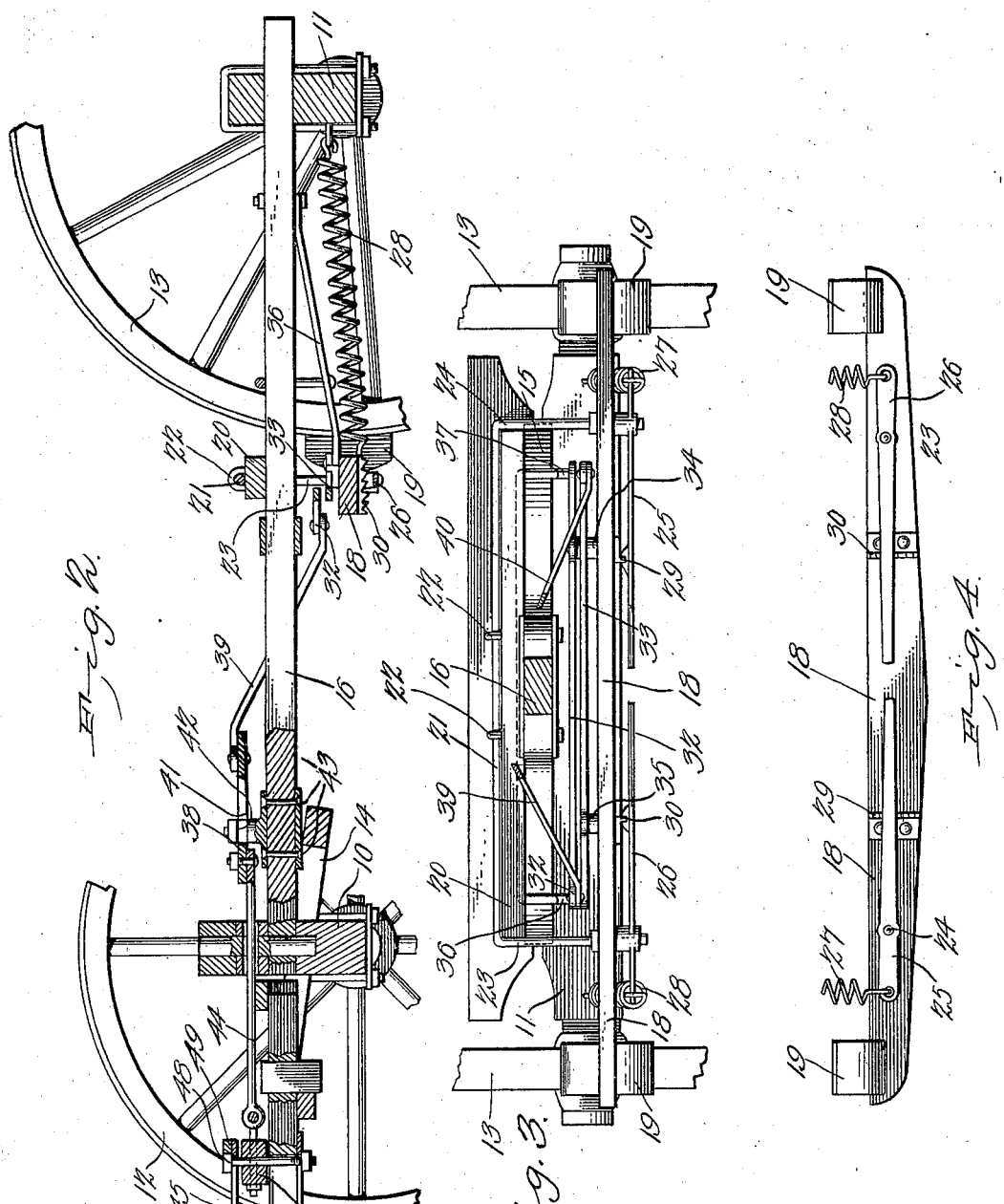

UNITED STATES PATENT OFFICE.

WILLIAM H. BEARD, OF GARDEN, OHIO.

AUTOMATIC WAGON-BRAKE.

SPECIFICATION forming part of Letters Patent No. 727,737, dated May 12, 1903.

Application filed December 12, 1902. Serial No. 134,955. (No model.)

*To all whom it may concern:*

Be it known that I, WILLIAM H. BEARD, a citizen of the United States, residing at Garden, in the county of Athens and State of Ohio, have invented a new and useful Automatic Wagon-Brake, of which the following is a specification.

This invention relates to vehicle-brakes of the class known as "automatic-operating" brakes, and has for its object to improve the construction of brakes of this class and to provide a simple, inexpensive, and efficient device adapted to relieve the wheels of the vehicle when the draft-animals are started forward and to automatically lock the wheels when the draft is withdrawn.

The invention consists in certain novel features of construction, as hereinafter shown and described, and specified in the claims.

In the drawings illustrative of the invention, in which corresponding parts are designated by like reference characters in all the figures, Figure 1 is a plan view of the running-gear of a vehicle with the improvements applied. Fig. 2 is a longitudinal sectional elevation. Fig. 3 is a transverse section on the line III III of Fig. 1 looking toward the rear of the vehicle. Fig. 4 is a bottom plan view of the brake-beam and its attachments.

The improved device may be applied to any ordinary lumber or farm wagon, and for the purpose of illustration a wagon of this character is employed to illustrate the application of the device, 10 representing the forward axle, 11 the rear axle, 12 the forward wheels, 13 the rear wheels, 14 the forward hounds, 15 the rear hounds, 16 the reach or connecting-bar, and 17 the tongue, connected in the ordinary manner detachably to the hounds 14, all these parts being of the ordinary construction.

A brake-beam 18 is disposed transversely of the reach 16 adjacent to the rear wheels 13 and provided with brake-shoes 19, adapted to engage the forward faces of the rear wheels when the device is operated, as shown in Fig. 1.

Transversely disposed across the rear running-gear is a bar 20, rigidly secured in place and with oppositely-extending ends, as shown. Longitudinally disposed upon this bar 20 is a rocker-arm 21, supported rotatively upon the bar by clips 22, spaced apart, as shown.

The ends of the rocker-arm 21 are turned downwardly, as at 23 24, and passed through the brake-beam 18 and secured in place by nuts or other suitable fastenings and forming the suspension means for the brake-beam. The downwardly-turned ends 23 24 of the rocker-arm 21 engage the ends of the bar 20, as shown, so that the bar supports the rocker-arm its full length and prevents any tendency of the latter to sag under strains. By this arrangement it will be obvious that the brake-beam is free to swing toward and away from the wheels 13 upon the rocker-arm 21 as a center.

Pivotally supported upon the members 23 24 below the brake-beam are adjusting-levers 25 26, the levers extending outwardly away from their pivotal points and connected, respectively, to the rear axle by springs 27 28 and extending inwardly, as shown in Fig. 4, and adapted to be adjustably engaged by toothed bars 29 30, by which means the tension of the springs may be adjusted by setting the levers in engagement with the toothed racks. By this arrangement the tension of the springs may be very quickly and readily adjusted and increased or decreased as required. By this arrangement it will be obvious that the springs 27 28 exert a constant pulling force upon the brake-beam to maintain the brake-shoes 19 in engagement with the wheels 13, and thus lock the running-gear fast to the rear wheels with a force equal to the resiliency of the springs.

A mechanism is attached to the running-gear between the doubletree 31 and the brake-beam 18, whereby when the draft is applied upon the doubletree the brake-beam 18 will be moved forwardly and release the wheels 13, and this mechanism is constructed as follows: Pivotally connected to the brake-beam are two lever-arms 32 33, the pivotal points being indicated, respectively, at 34 35, the pivotal points being located, preferably, near one end of the levers, thus forming the lever-arms into short and long ends. The short ends of the lever-arms 32 33 will be connected, respectively, to the rear running-gear, preferably to the rear hounds 15, by connecting-bars 36 37 and the longer ends of the lever-arms connected to a centrally-disposed plate 38 by connecting-rods 39 40, as shown. The plate 38 is provided with a longitudinal slot 41, and thereby secured slidably in position upon the reach 16 by a stud 42, the stud connected rigidly to the reach, as indicated in Fig. 2, by bolts 43 or by other suitable means. The plate 38 is connected by a rod 44 to the doubletree 31, as shown, and the doubletree slidably disposed upon the tongue, as by a longitudinal slot 45 in a keeper 46 and a similar longitudinal slot 47 in the tongue 17, the pivot-bolt 48 of the doubletree passing through the two slots and likewise through the doubletree, as indicated in Figs. 1 and 2. By this arrangement it will be obvious that when the draft is applied upon the doubletree the latter will be drawn forward and through its connection with the plate 38 by the connecting-rod 44 will correspondingly move the latter forwardly, and thus actuate the lever-arms 32 33 through the rods 39 40, and thus draw the brake-beam and the shoes 19 free from the wheels 13. By this means the shoes 19 will be maintained out of engagement with the wheels 13 so long as the draft is applied; but the moment the draft is withdrawn or the team attempts to back the springs 27 28 will be released and immediately draw the shoes into rigid engagement with the rear wheels and firmly lock the vehicle in position.

Attached to the keeper 46 is a bell-crank lever 49, adapted when thrown into the position shown by dotted lines in Fig. 1 to engage the rear side of the pivot-bolt 48 and lock the doubletree into its forward position, and thus form a stop means by which the brake-beam and its shoes 19 may be maintained out of action or in an inoperative position. Thus when running over level roads or in other localities where the automatic brake mechanism is not required the device may be readily locked in an inoperative position by simply throwing the stop-lever into action.

The stop-lever 49 may be operated in any desired manner, but preferably by a small cord or chain (indicated at 50) leading to some point on the vehicle convenient to the hand of the driver. This makes a very simple, easily-applied, and effective apparatus for automatically locking the rear wheels of the vehicle when the draft is removed and will be found very useful when running down steep grades or when it is desired to lock the running-gear when the team stops.

The device is positive and reliable in operation and is adapted to be readily applied to any ordinary running-gear.

When the draft-animals stop or when the traces slacken, the brake is automatically applied, and in descending hills or other inclines the brake will be automatically applied as the vehicle moves forward toward the draft-animals sufficiently to slacken the traces.

The means by which the tension of the springs is regulated is an important feature of the invention and adds materially to the efficiency and operativeness of the device, as by this means the device may readily be adapted to the vehicle to which it is applied or to the load borne thereby and likewise to the grades over which it travels.

The device will be found very useful in moving up grades, as in event of the horses slackening the draft when going up a grade the rear wheels will be immediately firmly locked automatically and all danger of the vehicle running backwardly down the grade obviated. By this means no necessity exists for blocking the wheels of a vehicle to prevent them from running backwardly down a grade, as the wheels will be automatically locked, as above noted, the moment the draft is slackened.

Changes in the form, proportions, and minor details of construction may be resorted to without departing from the principle of the invention or sacrificing any of its advantages.

Having thus described the invention, what is claimed is—

1. In a device of the character described, the vehicle running-gear, a brake-beam having shoes engaging the wheels of the vehicle and movably supported from said running-gear, one or more levers intermediately pivoted upon said brake-beam, springs connecting one end of said lever or levers to the running-gear, means for adjusting the opposite end of said lever or levers to regulate the tension of said springs, and connecting means between said brake-beam and the draft mechanism, substantially as described.

2. In a device of the character described, the vehicle running-gear, a rocker-arm movably supported upon said running-gear, a brake-beam having shoes engaging the wheels of the vehicle and supported from said rocker-arm, one or more levers intermediately pivoted upon said brake-beam, springs connecting one end of said lever or levers to the running-gear, means for adjusting the opposite end of said lever or levers to regulate the tension of said springs, and connecting means between said brake-beam and the draft mechanism, substantially as described.

3. In a device of the character described, the vehicle running-gear, a rocker-arm having depending ends and movably supported upon said running-gear, a brake-beam having shoes engaging the wheels of the vehicle and supported upon said depending ends, one or more levers intermediately pivoted upon said brake-beam, springs connecting one end of said lever or levers to the running-gear, means for adjusting the opposite end of said lever or levers to regulate the tension of said springs, and connecting means between said brake-beam and the draft mechanism, substantially as described.

4. In a device of the character described, the vehicle running-gear, a rocker-arm having depending ends and movably supported from said running-gear, a brake-beam having shoes engaging the wheels of the vehicle and supported upon said depending ends, one or more levers pivotally connected to said depending ends adjacent to said beam, springs connecting said levers from one end to the running-gear, locking-plates having spaced notches and adapted to engage the opposite ends of said levers, and connecting means between said brake-beam and the draft mechanism, substantially as described.

5. In a device of the character described, the vehicle running-gear, a brake-beam having shoes engaging the wheels of the vehicle and movably disposed upon the running-gear, springs disposed to yieldably maintain said brake-shoes in engagement with the wheels, operating-levers pivotally connected to said beam near one end, connecting-bars between the shorter ends of said levers and the running-gear, and connecting means between the longer ends of said levers and the draft mechanism, substantially as described.

6. In a device of the character described, the vehicle running-gear, a brake-beam having shoes engaging the wheels of the vehicle and movably disposed upon the running-gear, springs disposed to yieldably maintain said brake-shoes in engagement with the wheels, operating-levers each pivotally connected near one end to said beam, connecting-bars between the shorter ends of said levers and the running-gear, a link slidably disposed upon the running-gear, connecting-bars between said link and the longer ends of said operating-levers, and connecting means between said link and the draft mechanism, substantially as described.

7. In a device of the character described, the vehicle running-gear, a brake-beam movably engaging said running-gear and having shoes engaging the wheels of the vehicle, springs disposed to yieldably maintain said brake-shoes in engagement with the wheels, operating-levers each pivotally connected near one end to said beam, a stud extending from the running-gear, a link having a longitudinal slot and movably engaging said stud, connecting-bars between said link and the longer ends of said operating-levers, and connecting means between said link and the draft mechanism, substantially as described.

8. In a device of the character described, the vehicle running-gear, a brake-beam movably connected to said running-gear and having shoes engaging the wheels of the vehicle, springs disposed to yieldably maintain said shoes in engagement with said wheels, the vehicle-tongue having a longitudinal aperture, a keeper having a longitudinal aperture registering with the aperture in said tongue, the doubletree, a pivot-pin centrally disposed in said doubletree and movably engaging said registering apertures, connecting means between said beam and doubletree, a movably-disposed stop-lever adapted to be turned into the path of said doubletree-pivot to form a stop thereto and lock the draft mechanism in its forward position, substantially as described.

9. In a device of the character described, the vehicle running-gear, a brake-beam movably supported upon said running-gear and having shoes engaging the wheels of the vehicle, springs disposed to yieldably maintain said shoes in engagement with said wheels, operating-levers each pivotally connected near one end to said beam, connecting-bars between the shorter ends of said levers and the running-gear, a link slidably disposed upon the running-gear, connecting-rods between said link and the longer arms of said operating-levers, the doubletree slidably disposed relative to the tongue of the vehicle, and a connecting-rod between the doubletree and link, substantially as described.

10. In a device of the character described, the vehicle running-gear, a supporting-bar transversely disposed upon said running-gear, a rocker-arm having depending ends and movably disposed upon said bar, clips connecting said rocker-arm to said bar and extended to form the connecting means between the bar and running-gear, a brake-beam having shoes engaging the wheels of the vehicle and supported from the depending ends of said rocker-arm, springs disposed to maintain said brake-shoes yieldably in engagement with the vehicle-wheels, and connecting means between the brake-beam and the draft mechanism, substantially as described.

In testimony that I claim the foregoing as my own I have hereto affixed my signature in the presence of two witnesses.

WILLIAM H. BEARD.

Witnesses:
A. MURPHY,
H. W. MURPHY.